United States Patent
Herwig

(10) Patent No.: US 8,500,017 B2
(45) Date of Patent: Aug. 6, 2013

(54) SCANNER AND WEIGH SCALE WITH SELF-CENTERING SURFACE

(75) Inventor: Nathaniel Christopher Herwig, Lawrenceville, GA (US)

(73) Assignee: NCR Corporation, Duluth, GA (US)

( * ) Notice: Subject to any disclaimer, the term of this patent is extended or adjusted under 35 U.S.C. 154(b) by 124 days.

(21) Appl. No.: 12/961,173

(22) Filed: Dec. 6, 2010

(65) Prior Publication Data

US 2012/0138672 A1   Jun. 7, 2012

(51) Int. Cl.
*G06K 7/00* (2006.01)
(52) U.S. Cl.
USPC .......................... 235/439; 235/454; 235/435
(58) Field of Classification Search
USPC ................................................ 235/435–486
See application file for complete search history.

(56) References Cited

U.S. PATENT DOCUMENTS

| 6,036,094 A * | 3/2000 | Goldman et al. | 235/462.45 |
| 6,583,369 B2 * | 6/2003 | Montagnino et al. | 177/177 |
| 2010/0116887 A1 * | 5/2010 | Barkan et al. | 235/440 |

FOREIGN PATENT DOCUMENTS

JP   63149774 A  *  6/1988

* cited by examiner

*Primary Examiner* — Christle Marshall
(74) *Attorney, Agent, or Firm* — Paul W. Martin; Harden E. Stevens, III

(57) ABSTRACT

An optical scanner comprising a weigh scale is presented with a self-centering top plate. The design of the top plate creates a horizontal gravitation vector on objects placed on and away from the center of the top plate. The force vector is directed toward the center of the top plate and diminishes to zero as the object approaches the center of the top plate.

20 Claims, 4 Drawing Sheets

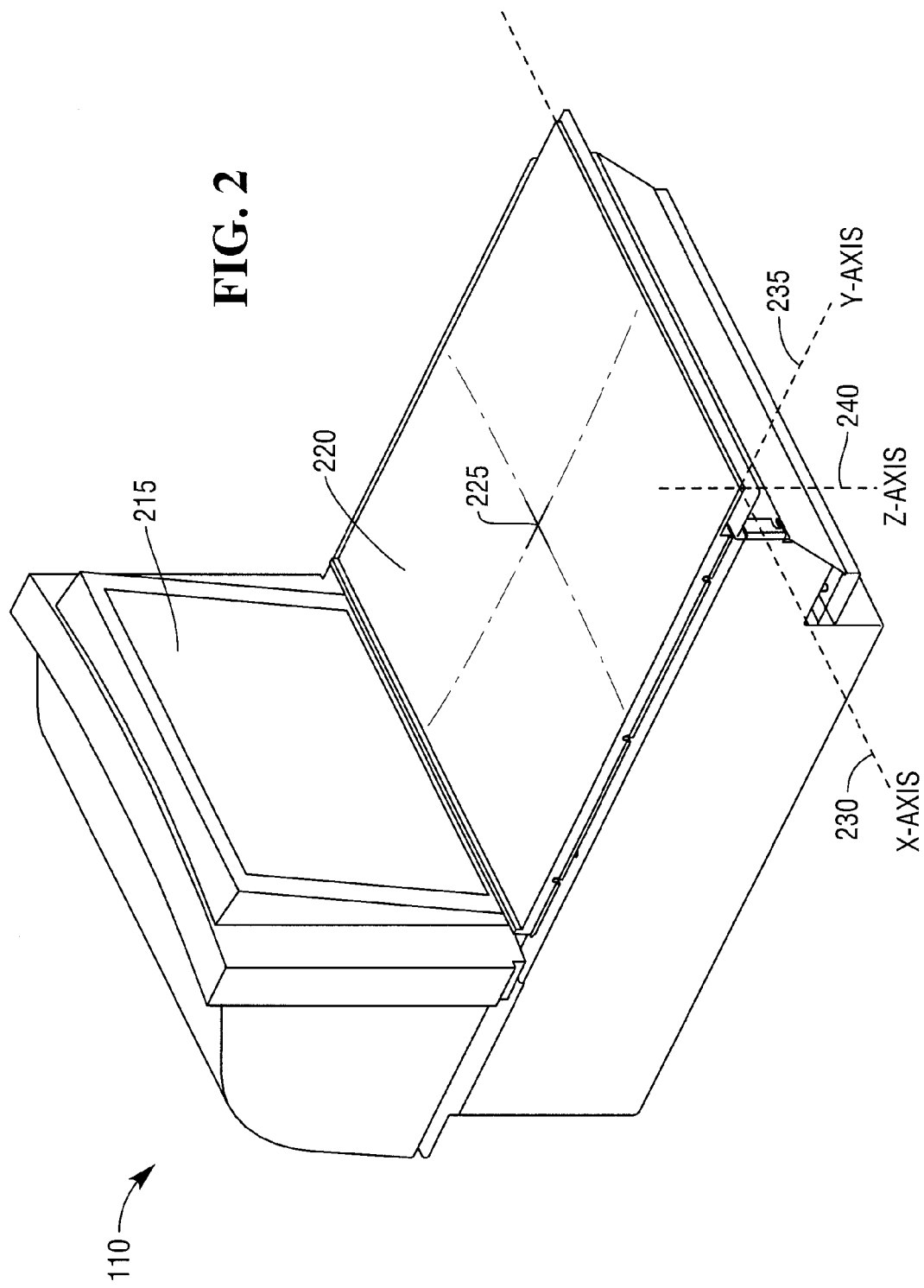

SCANNER AND WEIGH SCALE WITH SELF-CENTERING SURFACE

FIELD OF THE INVENTION

The present invention relates generally to optical code scanners. More particularly, but not exclusively, the invention relates to optical code scanners with an integrated weigh scale.

BACKGROUND

In a general retail environment where groceries are sold, it is common for a point-of-sale (POS) terminal to include an item scanning device and for the item scanning device to have an integrated item weigh scale. The item scanning device scans an item presented to the POS terminal and if an optical code is found, reads the optical code and communicates the information to the POS terminal. The weigh scale determines the weight of one or more items placed on the weigh scale's "top plate" or "weigh plate" as it is sometimes referred to.

The top plate (horizontal surface) of a bi-optic item scanning device has a centered area composed of an optically transparent material to allow light, including laser light, to pass through. Whether the item scanning device is based on imaging or laser technology (or both), at least a portion of the top plate must allow light to pass through with a minimum of optical distortion and attenuation. This dictates the use of an optically clear material formed into a flat sheet with uniform thickness. The optically clear material is typically enclosed with a strong material for support. This material is can be a metal such as stainless steel. A top plate that meets these requirements is a major cost component of the item scanning device. In additional, items placed on the top plate will sometimes roll off or move around causing weighing errors or delays in reading the weigh of the item.

Thus, a need exists for a weigh scale device that has a lower cost top plate designed to center items placed on the top plate.

SUMMARY OF THE INVENTION

Among its several aspects, the present invention recognizes a condition wherein the top plate of weigh scale represents a major cost component of the weigh scale and that items placed on the top plate are prone to roll off or remain in motion. These conditions prevent the development of lower cost scale and slow down the process of weighing items.

The invention addresses these problems, as well as others, by recognizing that scanning technology has improved to point where horizontal item scanning is not always required to maintain a high first pass success rate for scanning an item. This allows the portion of the top plate comprising the optically clear material to be removed. The top plate is now composed of a low cost durable material. In addition, the top plate is formed into a concave shape that self-centers items placed on the top plate. This prevents them from rolling off and dampens their movement.

The upper surface of the top plate has a neutral color and finish to reduce specular reflections and improve the ability to identify an item placed on the top plate. In addition, the low cost durable material of the top plate is translucent to light projected onto the under side of the top plate. The translucent light that passes through the top plate is used to better define or silhouette the outline of items placed on the top plate for identification.

A more complete understanding of the present invention, as well as further features and advantages of the invention, will be apparent from the following Detailed Description and the accompanying drawings.

BRIEF DESCRIPTION OF THE DRAWINGS

FIG. 2 is a drawing of an item scanner used in an exemplar embodiment of the present invention.

DETAILED DESCRIPTION

In the following description, numerous details and embodiments are set forth to provide an understanding of the claimed invention. However, it will be appreciated by those skilled in the art that various modifications to the described embodiments may be made without departing from the spirit and scope of the invention and that numerous variations or modifications from the described embodiments are possible. Throughout this specification, like numbered elements are used to describe the same parts throughout the various drawing figures referred to and described.

Figure 1:
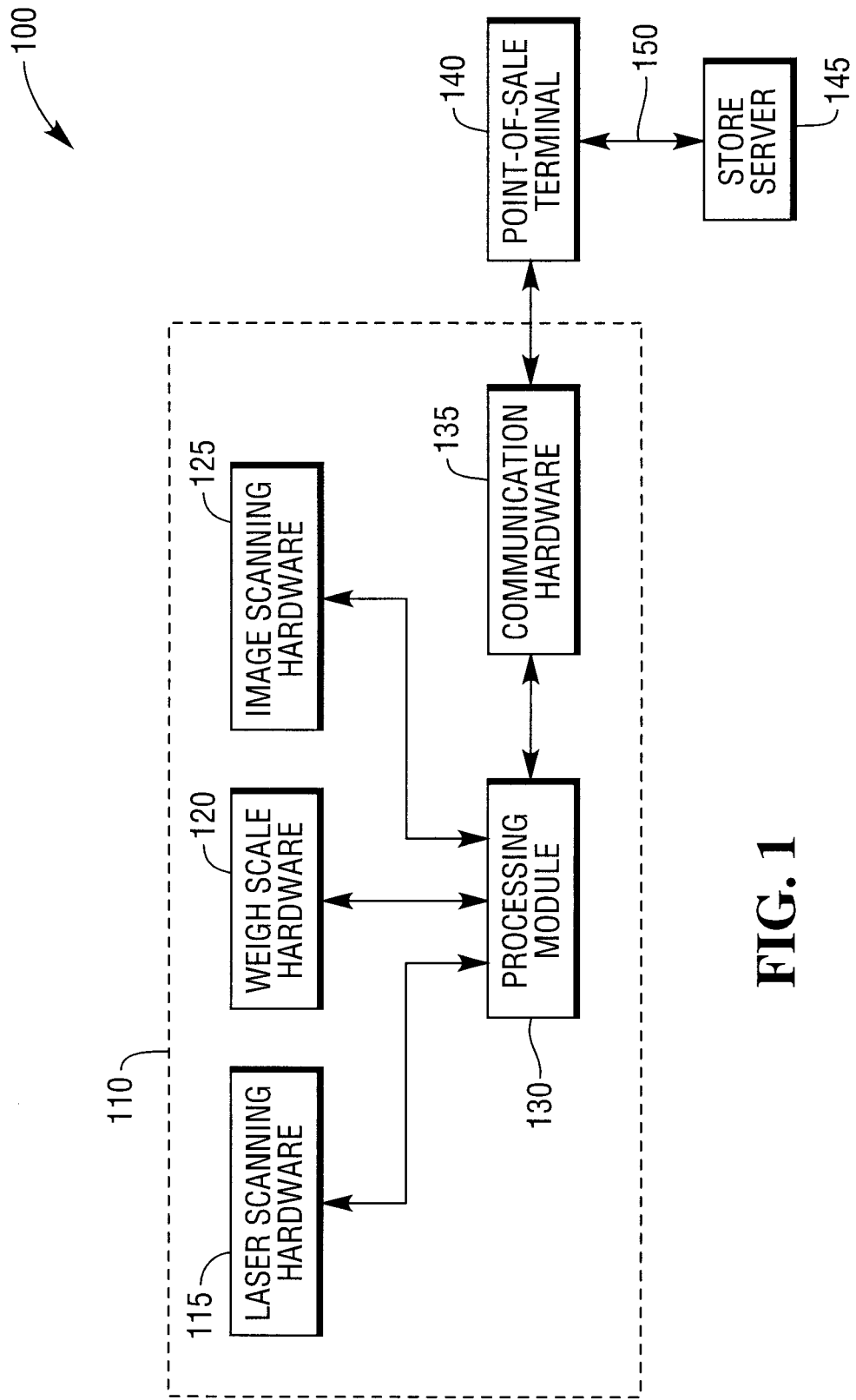
FIG. 1 is a high-level block diagram illustrating an exemplar embodiment of an item scanner in a retail environment.

Referring to FIG. 1, there is provided a high-level block diagram illustrating an exemplar embodiment of an item scanner 110 in a retail environment 100. The retail environment 100 includes a store server 145 in communication with a point-of-sale (POS) terminal 140 over a network 150. A typical retail environment 100 has multiple POS terminals 140. The POS terminal 140 includes a number of devices and peripherals and can be configured to be either an assisted or self-service checkout terminal. An item scanner 110 is attached to the POS terminal 140. The item scanner 110 includes a processing module 130 that controls the functions of the item scanner 110. The item scanner 110 further includes the following hardware components: laser scanning hardware 115, image scanning hardware 125, weigh scale hardware 120 and communication hardware 135.

The communication hardware 135 provides the hardware to communicate with the POS terminal 140. The processing module 130 includes a processor, memory and hardware that allows the processor to communicate with and control the hardware components of the item scanner 110. The memory includes software instructions that when executed by the processor cause the processor to control the hardware components and implement the features and functions of the item scanner 110.

The memory provides both persistent and short term memory. Updates to the software instructions can be sent to the item scanner 110 by the POS terminal 140. These instructions can be provided directly to the POS terminal 140 or by the store server 145. The updates to the software instructions can be stored on a portable memory device that is attached to the POS terminal 140 or the store server 145. Once attached, the updates to the software instructions are read from the portable memory device and sent to the item scanner 110 for storage and execution by the item scanner 110. In some embodiments, the updates to the software instructions are retrieved from, or automatically sent from a central server over the Internet or some other wide area network to the store server 145 and then sent to the item scanner 110. There maybe one or more intermediate servers between the store server 145 and the central server.

In some embodiments, the item scanner 110 includes either the laser scanning hardware 115 or the image scanning hardware 125 but not both. In still other embodiments, an external camera (not shown) is attached to either the item scanner 110 or the POS terminal 140. The external camera is adapted to recognize produce and to captures photos of documents presented to the POS terminal 140. The external camera is often located above the item scanner 110 and directed down towards the item scanner 110. In embodiments without an external camera, an image capture device in the image scanning hardware 125 can be used to recognize produce and capture photos of documents.

Turning to FIG. 2, there is provided a drawing of an item scanner 110 used in an exemplar embodiment of the present invention. The item scanner 110 uses a vertical window 215 to scan for optical codes. The plane of the vertical window 215 is typically angled off the vertical or z-axis 240. In this embodiment, the optical codes are bar codes which include both one-dimensional and two-dimensional bar codes. The bar codes are typically attached to items presented to the POS terminal 140 for purchase. In some cases, one or more bar codes maybe attached to or printed on a sheet of paper. These bar codes are for products or services that because of the nature of the products or services are not easily presented to the POS terminal 140 for purchase. Examples of these products or services are: a 50 pound bag of dog food or ice stored in an outside ice machine or an oil change for a vehicle. In these cases, a bar code for the related product or service that is printed on a sheet is scanned. Both the laser scanning hardware 115 and image scanning hardware 125 use the vertical window 215 to read bar codes.

The item scanner 110 includes weigh scale hardware 120 that determines the weight of an item or items placed on a top plate 220 and then communicates the weight to the POS terminal 140. The top plate 220 forms the lower or horizontal surface of the item scanner 110 and has a geometric center 225. For reference, an x-axis 230 is provided that is parallel to the front edge of the item scanner 110 and an y-axis 235 that is parallel to the side edge of the item scanner 110.

Figure 3A:
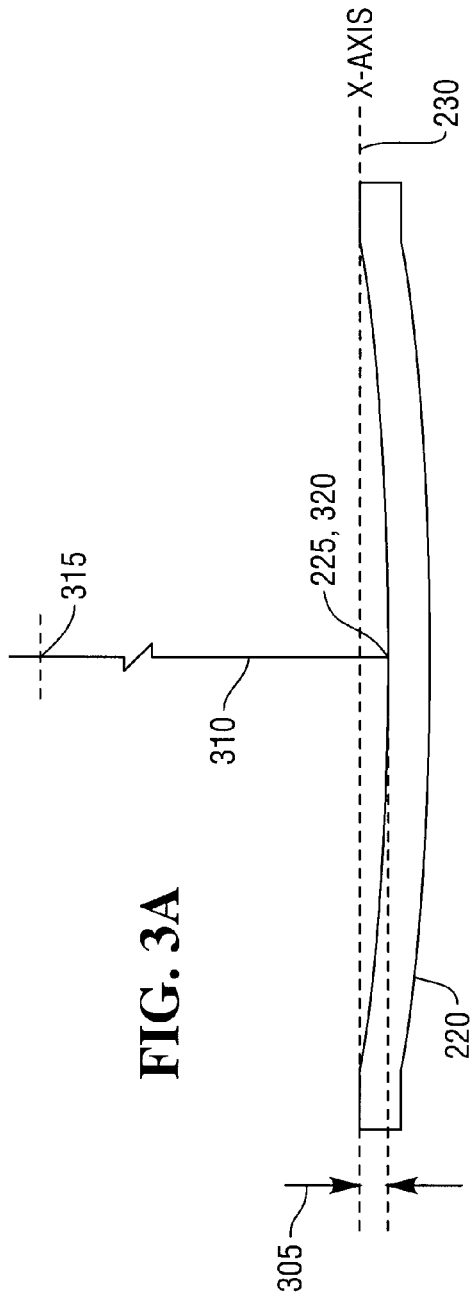
FIG. 3A is a first cross section drawing of a top plate of an item scanner used in an exemplar embodiment of the present invention.
Figure 3B:
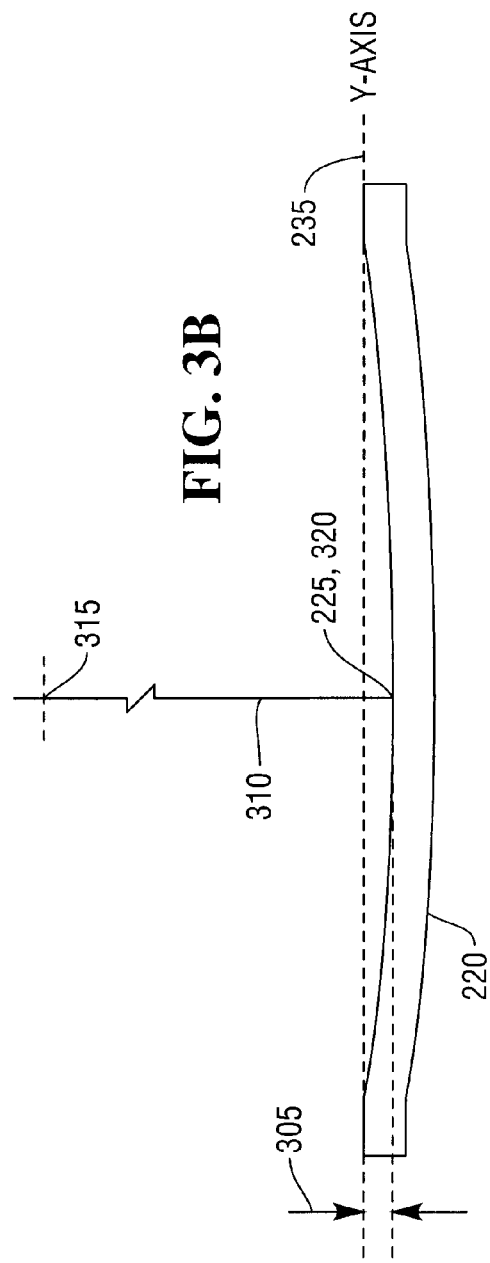
FIG. 3B is a second cross section drawing of the top plate of the item scanner used in an exemplar embodiment of the present invention.

Turning to FIG. 3A, there is provided a first cross section drawing of a top plate 220 of the item scanner 110 used in an exemplar embodiment of the present invention. The top plate 220 is designed to have a concave shape as illustrated in FIGS. 3A and 3B. The center of curvature 315 for the top plate 220 is located above the item scanner 110 on the principal axis 310 of the top plate 220 which intersects the top plate 220 at the geometric center 225. This point is also referred to as the vertex 320 of the principal axis. FIG. 3A depicts a cross section of the top plate 220 where the section is parallel to x-axis 230 and cuts through the center 225 of the top plate 220. The depth 305 of the top plate curvature is measured at the center 225 of the top plate 220 and is the distance from the upper surface of the top plate 220 to a straight line parallel to the x-axis 230 and passing through the two upper side edges of the top plate 220

Turning to FIG. 3B, there is provided a second cross section drawing of a top plate 220 of the item scanner 110 used in an exemplar embodiment of the present invention. FIG. 3B depicts a cross section of the top plate 220 where the section is parallel to y-axis 235 and cuts through the center 225 of the top plate 220. The depth 305 of the top plate curvature is the same as in FIG. 3A however, the straight line in this figure is parallel to the y-axis 235 not the x-axis 230.

The depth 305 for a top plate 220 can vary between different embodiments depending on the overall dimensions of the top plate 220 while still keeping the center of curvature 315 at the same location above the top plate 220 for the same dimension (x or y). If the top plate 220 is a rectangular shaped plate, the location of center of curvature will be different for the x-axis and y-axis. If the top plate 220 is a square plate, the location of the center of curvature is at the same location for both axes. Typical values for the depth 305 range from 0.1" to 0.5" (inches). In addition, scanners 110 with a larger top plate 220 could have a larger depth 305 and center of curvature 315 that is further away from the top plate 220.

Figure 4:
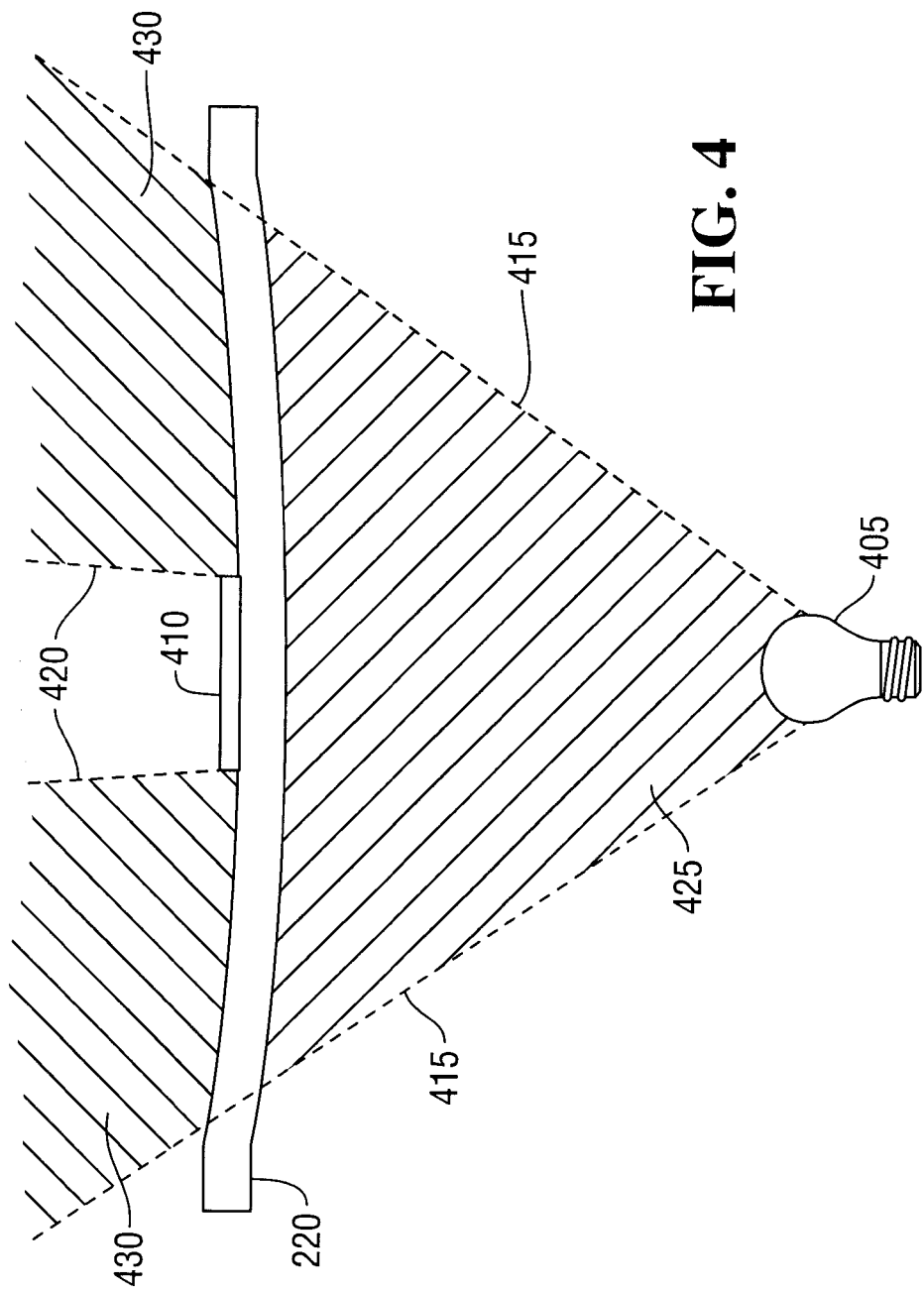
FIG. 4 is a partial cross section drawing of an item scanner.

Turning to FIG. 4, there is provided a partial cross section drawing of an item scanner 110. The top plate 220 is depicted with a driver's license 410 laying face up centered on the upper surface of the top plate 220. A light source 405 is located under the top plate 220 and inside the item scanner 110. The light source 405 directs light 415 to and illuminates the underside of the top plate 220 (area 425). The top plate 220 is constructed of a translucent material that transmits a portion of the light from the light source 405 through to the upper side of the top plate 220 creating a diffuse light source on the upper side of the top plate 220 (area 430). The diffuse light from the top plate 220 provides an outline of objects placed on the top plate 220. Here, the edges of the driver's license are clearly outlined 420 by the diffuse light. This improves the ability of software to process a photo of the driver's license 410. A photo of the driver's license can be captured by a camera not located in the item scanner 110 or an image capture device that is part of the item scanner 110 can be used. The diffuse light also aids in recognizing products or other objects placed on the top plate 220 by clearly defining the edges of the object.

The upper surface of the top plate has a neutral color and finish. This can be a painted on color and finish or it can be inherent to the material that composes the top plate. In this embodiment, a charcoal color is used but other embodiment can use different neutral colors. To reduce specular reflections, a matte finish is used.

Although particular reference has been made to an item scanner 110 used a retail environment and examples have been provided illustrating the invention, certain other embodiments, variations and modifications are also envisioned within the spirit and scope of the following claims.

I claim:

1. An optical code scanner comprising:
   a housing including a top plate that forms the horizontal surface of the optical code scanner and a vertical scanning window adjacent to and raising above the rear of the top plate;
   an optical code scanning device located within the housing and adapted to only use the vertical scanning window to read an optical code presented to the optical code scanner; and
   a weigh scale device located within the housing and adapted to determine the weight of an item placed on the top plate where the top plate has a self-centering concave surface with the center of curvature located above the top plate and where the top plate is composed of a material that is optically translucent.

2. The optical code scanner of claim 1, where the principal axis of the top plate generally passes through the two dimensional center of the top plate using the x-axis and y-axis to determine the center of the top plate.

3. The optical code scanner of claim 1, where the upper surface of the top plate has a neutral color and finish.

4. The optical code scanner of claim 3, where the neutral color is charcoal color.

5. The optical code scanner of claim 3, where the neutral finish is a matte finish.

6. The optical code scanner of claim 1, where the concave surface of the top plate causes an item placed on the top plate at point away from the vertex of the top plate to have a gravitation force vector with a lateral force component where the lateral force component pulls the item toward the vertex.

7. The optical code scanner of claim 6, where the magnitude of the lateral force component is zero when the item is located at the vertex of the top plate.

8. The optical code scanner of claim 1, where the top plate transmits only a portion of the light from a light source located below the top plate inside the optical code scanner out the upper surface of the top plate.

9. The optical code scanner of claim 7, where the translucent light from upper surface of the top plate illuminates an item placed on the top plate and creates a silhouette of the item.

10. The optical code scanner of claim 1, where the optical code scanning device includes a laser scanning device adapted to read the optical code presented to the optical code scanner.

11. The optical code scanner of claim 1, where the optical code scanning device includes an image scanning device adapted to read the optical code presented to the optical code scanner by capturing an image of the optical and processing the image to read the optical code.

12. A retail system for scanning items for purchase, the system comprising:
  a store server;
  a point of sale terminal in communication with the store server; and
  an optical code scanner in communication with the point of sale terminal, the optical code scanner comprising:
    a housing including a top plate that forms the horizontal surface of the optical code scanner and a vertical scanning window adjacent to and raising above the rear of the top plate;
    an optical code scanning device located within the housing and adapted to only use the vertical scanning window to read an optical code presented to the optical code scanner; and
    a weigh scale device located within the housing and adapted to determine the weight of an item placed on the top plate where the top plate has a self-centering concave surface with the center of curvature located above the top plate and where the top plate is composed of a material that is optically translucent.

13. The optical code scanner of claim 12, where the principal axis of the top plate generally passes through the two dimensional center of the top plate using the x-axis and y-axis to determine the center of the top plate.

14. The optical code scanner of claim 12, where the upper surface of the top plate has a neutral color and finish.

15. The optical code scanner of claim 14, where the neutral color is charcoal color.

16. The optical code scanner of claim 14, where the neutral finish is a matte finish.

17. The optical code scanner of claim 12, where the concave surface of the top plate causes an item placed on the top plate at point away from the vertex of the top plate to have a gravitation force vector with a lateral force component where the lateral force component pulls the item toward the vertex.

18. The optical code scanner of claim 17, where the magnitude of the lateral force component is zero when the item is located at the vertex of the top plate.

19. The optical code scanner of claim 12, where the top plate transmits only a portion of the light from a light source located below the top plate inside the optical code scanner out the upper surface of the top plate.

20. The optical code scanner of claim 19, where the translucent light from upper surface of the top plate illuminates an item placed on the top plate and creates a silhouette of the item.

* * * * *